(12) United States Patent
Ng et al.

(10) Patent No.: US 9,300,235 B2
(45) Date of Patent: Mar. 29, 2016

(54) SYSTEM AND METHOD FOR SERIAL COMMUNICATION BY AN ELECTRONIC CIRCUIT

(71) Applicant: Allegro Microsystems, Inc., Worcester, MA (US)

(72) Inventors: Chee-Kiong Ng, Acton, MA (US); Christopher Alger, Holden, MA (US); Timothy Reynolds, Westborough, MA (US)

(73) Assignee: Allegro Microsystems, LLC, Worcester, MA (US)

( * ) Notice: Subject to any disclaimer, the term of this patent is extended or adjusted under 35 U.S.C. 154(b) by 151 days.

(21) Appl. No.: 13/851,631

(22) Filed: Mar. 27, 2013

(65) Prior Publication Data

US 2014/0292247 A1 Oct. 2, 2014

(51) Int. Cl.
*H02P 1/00* (2006.01)
*H02P 3/00* (2006.01)
*H02P 7/00* (2006.01)
*H02P 29/00* (2006.01)
*H02P 23/00* (2006.01)

(52) U.S. Cl.
CPC .............. *H02P 7/00* (2013.01); *H02P 23/0077* (2013.01); *H02P 29/00* (2013.01)

(58) Field of Classification Search
CPC ........... G05B 2219/36025; G05B 2219/36031; G05B 2219/36036; G05B 2219/21069; G05B 2219/21081; G05B 2219/21088; G06F 1/26; G06F 1/28; G06F 1/30; G06F 13/4295; G06F 13/4256; H02J 1/08; H02M 2001/008

USPC ............. 318/400.1, 400.29, 34, 66, 558, 268, 318/696, 40, 42, 286.5, 568.13

See application file for complete search history.

(56) References Cited

U.S. PATENT DOCUMENTS

| 5,742,143 | A  | * | 4/1998  | Katagiri ......................... 318/625 |
| 6,618,628 | B1 | * | 9/2003  | Davlin ............... G05B 19/0421 |
|           |    |   |         | 700/20 |
| 6,804,016 | B2 | * | 10/2004 | Hashimoto et al. .......... 358/1.13 |
| 6,949,916 | B2 | * | 9/2005  | Chapuis ......................... 323/282 |
| 6,952,618 | B2 | * | 10/2005 | Davlin ............... G05B 19/0421 |
|           |    |   |         | 340/2.1 |
| 7,000,125 | B2 | * | 2/2006  | Chapuis et al. ............... 713/300 |
| 7,049,798 | B2 | * | 5/2006  | Chapuis et al. ............... 323/282 |
| 7,111,121 | B2 | * | 9/2006  | Oishi et al. ..................... 711/115 |

(Continued)

FOREIGN PATENT DOCUMENTS

| EM | 2 405 569 A2 | 1/2012 |          |
| EP | 2405569 A2 * | 1/2012 | .............. H02P 6/001 |
| JP | 2011065152 A * | 3/2011 |          |

OTHER PUBLICATIONS

PCT Search Report and Written Opinion of the ISA dated Oct. 6, 2014; for PCT Pat. App. No. PCT/US2014/015521; 8 pages.

(Continued)

*Primary Examiner* — Paul Ip
(74) *Attorney, Agent, or Firm* — Daly, Crowley, Mofford & Durkee, LLP (57) ABSTRACT

A motor driver includes at least two terminals suitable for being coupled to a motor controller and to receive a motor command signal and transmit a motor status signal when the motor driver is controlling a motor. A serial data communication circuit may be configured to send and receive serial data over the at least two terminals when the at least two terminals are idle.

19 Claims, 4 Drawing Sheets

(56) References Cited

U.S. PATENT DOCUMENTS

| | | | | |
|---|---|---|---|---|
| 7,230,400 | B1* | 6/2007 | Dufner et al. | 318/400.1 |
| 7,254,452 | B2* | 8/2007 | Davlin | G05B 19/0421 700/2 |
| 7,394,445 | B2* | 7/2008 | Chapuis | G06F 1/26 345/204 |
| 7,506,179 | B2* | 3/2009 | Templeton | 713/300 |
| 7,646,382 | B2* | 1/2010 | Chapuis | G06F 1/26 345/204 |
| 7,653,757 | B1* | 1/2010 | Fernald et al. | 710/3 |
| 7,690,749 | B2* | 4/2010 | Kachi | 347/19 |
| 7,719,214 | B2* | 5/2010 | Leehey | G05B 19/042 318/286 |
| 7,774,074 | B2* | 8/2010 | Davlin | G05B 19/0421 700/2 |
| 7,793,005 | B1* | 9/2010 | Fernald et al. | 710/3 |
| 7,802,036 | B2* | 9/2010 | Takeuchi | G06F 13/4295 709/208 |
| 7,834,569 | B2* | 11/2010 | Li | H02P 8/36 318/400.29 |
| 8,049,456 | B2* | 11/2011 | Shahi | G05B 19/414 318/42 |
| 8,384,315 | B2* | 2/2013 | Shin | H02P 6/04 318/34 |
| 8,461,782 | B2* | 6/2013 | Ward | 318/40 |
| 8,598,830 | B2* | 12/2013 | Kim | H02P 6/001 318/152 |
| 2002/0012453 | A1* | 1/2002 | Hashimoto et al. | 382/112 |
| 2003/0225971 | A1* | 12/2003 | Oishi et al. | 711/115 |
| 2003/0234624 | A1* | 12/2003 | Frankel et al. | 318/268 |
| 2003/0234625 | A1* | 12/2003 | Frankel et al. | 318/268 |
| 2003/0236594 | A1* | 12/2003 | Frankel et al. | 700/300 |
| 2003/0236595 | A1* | 12/2003 | Frankel et al. | 700/300 |
| 2004/0039456 | A1* | 2/2004 | Davlin | G05B 19/0421 700/3 |
| 2004/0186629 | A1* | 9/2004 | Frankel et al. | 700/300 |
| 2005/0040779 | A1* | 2/2005 | Frankel et al. | 318/268 |
| 2005/0093501 | A1* | 5/2005 | Takahashi | G05B 19/0426 318/568.13 |
| 2005/0093601 | A1* | 5/2005 | Gerding et al. | 327/164 |
| 2005/0104910 | A1* | 5/2005 | Lapstun et al. | 347/5 |
| 2005/0146550 | A1* | 7/2005 | Kusakari | 347/19 |
| 2005/0171648 | A1* | 8/2005 | Frankel et al. | 700/300 |
| 2005/0219283 | A1* | 10/2005 | Kachi | 347/6 |
| 2005/0253885 | A1* | 11/2005 | Lapstun et al. | 347/15 |
| 2005/0280839 | A1* | 12/2005 | Lapstun et al. | 358/1.1 |
| 2006/0015616 | A1* | 1/2006 | Chapuis | G06F 1/26 709/225 |
| 2006/0030951 | A1* | 2/2006 | Davlin | G05B 19/0421 700/3 |
| 2006/0142901 | A1* | 6/2006 | Frankel et al. | 700/300 |
| 2006/0200629 | A1* | 9/2006 | Oishi et al. | 711/115 |
| 2007/0108932 | A1* | 5/2007 | Takahashi | G05B 19/0426 318/568.13 |
| 2007/0146771 | A1* | 6/2007 | Silverbrook et al. | 358/1.14 |
| 2007/0146783 | A1* | 6/2007 | Lapstun et al. | 358/1.15 |
| 2007/0156292 | A1* | 7/2007 | Frankel et al. | 700/300 |
| 2007/0188776 | A1* | 8/2007 | Lapstun et al. | 358/1.8 |
| 2007/0219756 | A1* | 9/2007 | Frankel et al. | 702/188 |
| 2007/0285042 | A1* | 12/2007 | Frankel et al. | 318/599 |
| 2008/0061725 | A1* | 3/2008 | Wu | H02P 8/36 318/696 |
| 2008/0074373 | A1* | 3/2008 | Chapuis | G06F 1/26 345/89 |
| 2008/0084171 | A1* | 4/2008 | Leehey | G05B 19/042 318/34 |
| 2008/0177397 | A1* | 7/2008 | Davlin | G05B 19/0421 700/3 |
| 2008/0189459 | A1* | 8/2008 | Takeuchi | G06F 13/4295 710/110 |
| 2009/0195206 | A1* | 8/2009 | Aoyama et al. | 318/600 |
| 2010/0052592 | A1* | 3/2010 | Shahi | G05B 19/414 318/558 |
| 2010/0164413 | A1* | 7/2010 | Kuo | H02P 25/028 318/135 |
| 2011/0031906 | A1* | 2/2011 | Yasohara | H02P 5/74 318/66 |
| 2011/0055442 | A1* | 3/2011 | Ward | G05B 19/0421 710/110 |
| 2011/0062900 | A1* | 3/2011 | Shin | H02P 5/74 318/51 |
| 2012/0007529 | A1* | 1/2012 | Kim | H02P 6/001 318/400.04 |
| 2012/0012288 | A1* | 1/2012 | Shahi | G05B 19/414 165/121 |
| 2012/0299523 | A1* | 11/2012 | Inoue | H02P 31/00 318/558 |
| 2014/0070740 | A1* | 3/2014 | Kim | H02P 6/001 318/400.06 |

OTHER PUBLICATIONS

Taiwanese Response with English Summary, Specifications, and Claims filed on Aug. 18, 2015 to Office Action dated Jun. 4, 2015; for Taiwarese Pat. App. No. 103105293; 45 pages.

PCT International Preliminary Report on Patentability dated Oct. 8, 2015; For PCT Pat. App. No. PCT/US2014/015521; 6 pages.

Taiwanese Office Action dated Jun. 4, 2015 with Search Report or Taiwanese Pat. App. No. 103105293; 10 pages.

Taiwanese Notice of Allowance with English allowed claims; for Taiwanese Pat. App. No. 103105293; 5 pages.

* cited by examiner

SYSTEM AND METHOD FOR SERIAL COMMUNICATION BY AN ELECTRONIC CIRCUIT

FIELD

This disclosure relates to circuits, systems, and processes for serial communications and, in particular, to I²C communications.

BACKGROUND

I²C is a two-wire, serial data communication protocol. It is used in a wide array of applications including, but not limited to: reading and writing memory such as EEPROM memory, PCI card management, accessing low speed DAC and ADC, managing monitor or LCD settings, controlling speakers and audio systems, communicating over automotive communication networks, etc.

An integrated circuit (IC) that provides an I²C interface requires two pins dedicated to the I²C data signals. The I²C protocol requires an SCL signal that provides an I²C clock signal and an SDA signal that provides an I²C data signal. Thus, I²C requires two pins: one for the SCL signal and one for the SDA signal.

Some integrated circuits implement I²C communication with pins that are normally used for other functions by switching between I²C and another (e.g. parallel) communication mode, or between I²C and other functions associated with the integrated circuit. However, a circuit that switches between an I²C mode and a non I²C mode often requires an additional pin, or some other mechanism, to turn the I²C mode on and off.

SUMMARY

This disclosure describes systems and methods for communicating via a serial communication link.

In an embodiment, a motor driver comprises at least two terminals suitable for being coupled to a motor controller and to receive a motor command signal and transmit a motor status signal when the motor driver is controlling a motor. The motor driver may also include a serial data communication circuit configured to send and receive serial data over the at least two terminals when the at least two terminals are idle.

In an embodiment, one of the at least two terminals is a start pin to receive a signal capable of starting the motor, and one of the at least two terminals is a lock pin on which a signal is provided indicating whether a speed of the motor is locked to a frequency reference. The serial data sent over the terminals may comprise I²C signals.

In another embodiment, a method comprises the step of receiving a motor command signal and transmitting a motor status signal on at least two terminals of a motor driver when the motor driver is controlling a motor. The method may also include the step of driving serial data communication signals over the at least two terminals when the at least two terminals are idle.

In an embodiment, the step of receiving the motor command signal comprises receiving a signal indicating whether to start the motor on one of the at least two terminals and the step of transmitting the status signal comprises transmitting a signal indicating whether a speed of the motor is locked to a reference frequency on one of the at least two terminals. The step of driving serial data may include driving I²C signals on one or both of the at least two terminals.

Like numbers in the drawings denote like elements. The figures, including the flowcharts and block diagrams, are provided for exemplary purposes and are not intended to limit the scope of this disclosure. Although the figures depict diagrams and flowcharts with particular numbers of blocks connected in particular arrangements or sequences, these are examples only. Other arrangements and sequences are within the scope of this disclosure.

DETAILED DESCRIPTION

Before describing the present invention, some introductory concepts and terminology are explained.

As known in the art, a spinning motor can act like a generator. The electromotive force produced by the spinning motor may be referred to as back-EMF. Signals produced by this back-EMF can be measured to determine the position and speed of the motor. For example, the magnitude of the back-EMF signals may be directly proportional to the speed of the motor. In some instances, these signals can be measured without the need for an external sensor. In these so-called "sensorless systems," the back-EMF signals may be fed back directly from the motor into an input of the motor driver circuit.

As used herein, the term "motor driver" is used to describe a circuit or plurality of circuits that drive an external motor. A motor driver may include an IC or other type of silicon chip, it may include discrete components, or it may include a combination of ICs and discrete components.

As used herein, the term "magnetic field sensing element" is used to describe a variety of electronic elements that can sense a magnetic field. The magnetic field sensing element can be, hut is not limited to, a Hall effect element, a magnetoresistance element, a magnetotransistor, or, a resolver, for example.

Different types of Hall effect elements can also be used to measure position and speed of the motor. These Hall effect elements include, for example, a planar Hall element, a vertical Hall element, and a circular vertical hall (CVH) element. As is also known, there are different types of magnetoresistance elements, for example, a semiconductor magnetoresistance element such as Indium Antimonide (InSb), a giant magnetoresistance (GMR) element, anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb), or another compound semiconductor material In GaAsP, or high mobility material, for example GaN As used herein, the term "signal" is used to describe an electronic characteristic, analog or digital, that can change over time. In contrast, as used herein, the term "value" is used to describe a digital electronic value that tends to be static, or that tends to change from time to time. However the terms signal and value can also be used interchangeably.

As used herein, the terms "software" and "firmware" may refer to computer readable instructions, stored in a volatile or non-volatile computer readable storage medium (such as a hard drive or memory). The computer readable instructions may be stored in a ROM, RAM, or other type of memory. The instructions, when read by a processor, may cause the processor or other circuits peripheral to the processor to perform certain functions or operations. Although described as "computer-readable," the instructions need not be accessed or executed by a traditional laptop or desktop computer. Rather, the computer-readable instructions may be accessed or carried out by any type of processor or circuit that is able to read and execute the instructions.

The terms "software" and "firmware" may also refer to other types of instructions such as microcode, machine-code, scripts, or any type of computer readable instruction set that can be stored in a computer readable storage medium and executed by a processor or circuit.

Figure 1:
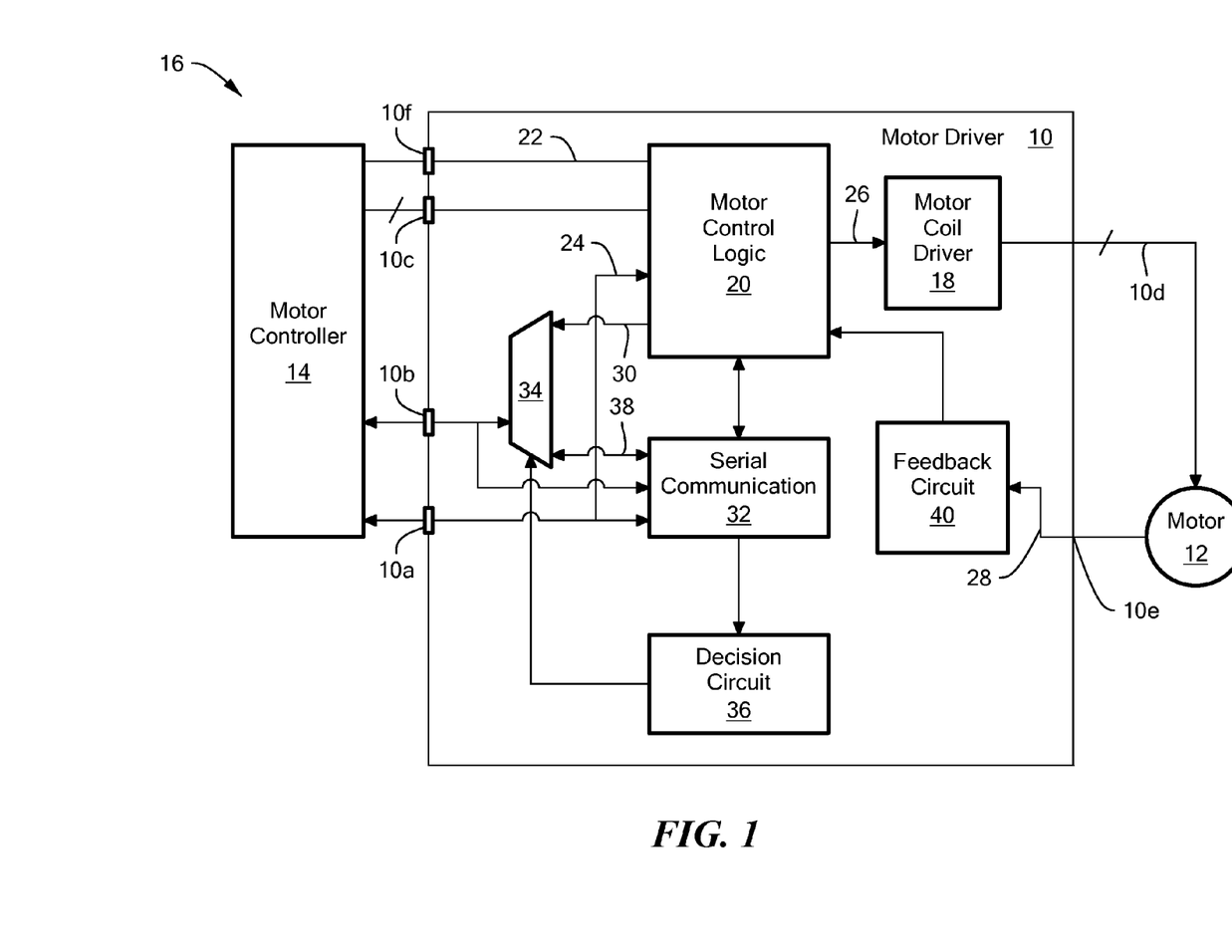
FIG. 1 is a block diagram of a motor driver providing serial data communication.

Referring to FIG. 1, a motor driver 10 is shown coupled to a motor 12. The motor driver 10 may be a circuit or group of circuits configured to power and control the motor 12. In an embodiment, the motor 12 may be an electric motor such as a brushed motor, a brushless motor, a stepper motor, etc. In another embodiment, the motor 12 may be a non-electric motor (e.g. an internal combustion engine, a hydraulic motor, etc.) that can be controlled by the motor driver 10.

The motor driver 10 may be coupled to a motor controller 14. The motor controller 14 may be a circuit or system that provides command signals and instructions to the motor driver 10 that tell the motor driver 10 how to control the motor 12. The motor controller may, in various embodiments, also provide other signals such as power, ground, a frequency reference signal, etc. Of course, these signals can also be provided to the motor driver 10 by other circuits and systems.

In an embodiment, the motor controller 14 may be an external circuit or processor that dictates control and operation of the motor 12. The motor controller 14 may send commands to the motor driver 10 for controlling aspects of the motor 12 such as starting, stopping, direction, and speed. The motor driver 10 may then energize and provide power to the motor 12 so that the motor 12 performs according to the commands. For example, the motor controller 14 may send a command instructing the motor driver 10 to start the motor 12, or to set the speed of the motor 12 to a particular frequency. When received, the motor driver 10 may then start the motor 12 and set the speed of the motor 12 to the particular frequency. The motor controller 14 may also receive feedback signals from the motor driver 10 that can be used by the motor controller 14 or other system components to determine if the motor is operating according to the command signals, and to adjust the command signals accordingly.

The motor driver 10 may provide an interface 16 for communication with the motor controller 14. The interface 16 may include one or more pins or terminals, buses, etc. As shown, the interface 16 may include a start pin 10a and a lock pin 10b.

The start pin 10a may be an input that receives a start signal 24 from the motor controller 14. In an embodiment, the start signal may be a DC signal that can be used to turn the motor 12 on an off. For example, when the motor start signal is high, the motor driver 10 may remove power from the motor so that the motor 12 turns off. While the start signal is tow, the motor driver 10 may energize the motor 12 so that the motor 12 runs.

In another embodiment, the logic levels may be switched so that a high start signal turns the motor on and a low start signal turns the motor off Although described as a DC signal, the start, signal may also be an AC signal, a digital signal, etc.

The lock pin 10b may be an output pin driven by the motor driver 10. The motor driver 10 may provide a lock signal 30 to indicate whether the speed of the motor is locked to a reference frequency. In an embodiment, the motor driver 10 may receive a reference frequency signal that indicates a speed at which the motor 12 should run. The motor driver 10 may include feedback circuits 40, which may include a phase locked loop (PLL) to "lock" the speed of the motor 12 to the received reference frequency. Once the motor 12 is running at the specified frequency, the motor driver 10 may assert the lock signal to let the motor controller 14 know that the desired motor speed has been achieved and that the speed is locked.

In an embodiment, when the speed of the motor 12 is locked, the motor driver 10 may drive the lock signal low, and when the motor 12 is not locked, the motor driver 10 may drive the lock signal high, or vice versa. Although described as a DC signal, the lock signal may also be an AC signal, a digital signal, etc.

The lock signal and the start signal may also be pulled high or low by pull-up or pull-down resistors or other pull-up or pull-down mechanisms) so that the motor controller 14 and the motor driver 10 only need to drive the signal in one direction—high or low—but not both.

The interface 16 may also have additional pins shown by I/O bundle 10c. I/O bundle 10c may include additional control signals, power signals, ground signals, busses, or any other type of signal that can be used to control or otherwise communicate with the motor 12 or the motor driver 10. In an embodiment, the interface 16 may be a five-wire motor interface. In this embodiment, the bundle 10c may comprise a power signal, a ground signal, and a reference frequency signal.

The frequency reference pin 10f may receive a frequency reference (FREF) signal 22 from the motor controller 14. The FREF signal 22 may be used to set a frequency, or speed, of the motor 12. For example, to change the speed of the motor 12, the motor controller 14 may change the frequency of the FREF signal 22. The motor driver 12 may then adjust the speed of the motor 12 accordingly. In an embodiment, the feedback circuit 40 may lock the speed of the motor 12, as described above, to the frequency of the FREF signal 20.

In an embodiment, the interface 16 may implement a BLDC type 1 interface. The BLDC type 1 interface may include (but is not limited to) a power pin (e.g. 24V), a ground pin, a digital START pin that is used by the motor controller 14 to turn the motor 12 on and off, an FREF (frequency reference) pin that is used by the motor controller 14 to provide a target speed or frequency for the motor, and a digital LOCK pin that is used by the motor driver 10 to indicate when the speed of the motor is locked to the target speed or frequency.

In another embodiment, the interface 16 may implement a BLDC type 2 interface. The BLDC type 2 interface may include (but is not limited to), the following pins: a power pin (e.g. 24V), a ground pin, a digital START pin that is used by the motor controller 14 to turn the motor 12 on and off, an FREF (frequency reference) pin that is used by the motor controller 14 to provide a target speed or frequency for the motor, a digital READY pin that is used by the motor driver 10 to indicate when the speed of the motor is locked to the target speed or frequency, a digital Da pin that is used by the motor controller 14 to specify a direction of rotation of the motor 12, a digital BRAKE pin used by the motor controller 14 to specify whether the motor driver 10 should actively stop the motor or passively allow the motor to slow and stop on its own, and an FGO pin used by the motor driver 10 to indicate the current speed of the motor 12.

Bundle 10d may comprise outputs used to drive the motor 12. These outputs, driven by motor coil driver module 18, may energize the coils of motor 12 in order to turn the motor 12 on and off and control the speed of the motor 12. In an embodiment, bundle 10d may include pairs of outputs, one output coupled to each end of each coil of the motor 12. For example, if the motor 12 has three coils, bundle 10d may include three pairs of outputs, each pair connected to the ends of a respective coil. The outputs in bundle 10d may also sink current, act as current return paths, when current is flowing through the coils of the motor 12.

Pin 10e may receive one or more input signals used to determine the current speed of the motor 12. The received signal(s) may be used by a feedback mechanism or circuit 40 to provide a feedback signal 28 to control the speed of the motor, to lock the speed of the motor in a PLL, to determine if the motor is spinning or if it is idle, etc. The feedback circuit 40 may include magnetic field sensors containing one or more magnetic field sensing elements, such as Hall Effect elements, magnetoresistive elements (including giant-magnetoresistive elements), a back-EMF module, or any other sensor or circuit that can determine speed or position of the motor 12. Examples of such feedback circuits and systems are described in U.S. patent application Ser. No. 13/718,548, filed Dec. 18, 2012, which is assigned to the assignee of the subject application and incorporated here by reference.

Motor driver 10 may also include a motor control logic module 20. The motor control logic module 20 may comprise logic circuitry and/or software to control the motor 12. For example, the motor control logic may receive a frequency reference signal 22 and a start signal 24 from the motor controller 14. The motor control logic module 20 may then send control signals 26 to the motor coil driver 18, which may drive the motor 12. The feedback signal 28 may be fed back to the motor control logic module 20. When the speed of the motor is locked, the motor control logic module may assert the lock signal 30.

Motor driver 10 may also include a serial communication module 32. In an embodiment, the serial communication module 32 may be an I²C transceiver or any other type of serial data communication module. The serial communication module 32 may be coupled to pin 10a and pin 10b so that it can send and receive serial communication signals through pins 10a and 10b. In an embodiment in which the serial communication module 32 is an I²C transceiver, pin 10a may be used to send and receive an I²C clock signal (i.e. an SCL signal) and pin 10b may be used to send and receive an I²C data signal an SDA signal).

Because the pin 10b is used for both the lock signal 30 and the SDA signal, the motor driver 10 may include a multiplexor 34 and a decision circuit 36. The decision circuit 36 may determine which signal, i.e. the lock signal 30 or the I²C SDA signal 38, should be sent as an output signal to the pin 10b.

In an embodiment, the serial communication module 32 may be active whenever the motor driver 10 is powered on. In other words, the serial communication module 32 is always capable of responding to receipt of a start condition at the pins 10a, 10b. This may allow the serial communication module 32 to communicate with the motor controller 14 or other circuits without the need to enter a special serial communication mode and without the need to add extra pins and/or circuitry to the motor driver 10 for the purpose of mode control.

While the motor 12 is running, the pin 10b may be used to communicate the lock signal, and the pin 10a may be used to communicate the start signal 24. Recall that the lock signal 30 may be driven low when the motor speed is locked to the reference frequency. Since this pulled down condition will not permit I²C signals to be conveyed, the lock signal 30 and the start signal 24 must not be pulled down for an I²C start condition and subsequently other I²C data signals to be successfully communicated. Thus, the motor 12 must be either stopped or operating without the lock signal 30 and the start signal 24 being pulled low or high when initiating and carrying out an I²C transfer. For example, the motor may be running in a test mode or another operational mode where the start signal 24 and the lock signal 30 are not pulled high or low. Accordingly, the serial communication module can send and receive serial data over the start pin 10a and the lock pin 10b when these pins are idle or not asserted (i.e., when the motor is stopped or operating without the lock signal 30 and the start signal 24 being pulled low or high). The serial communication module 32 may respond to the serial communication, such as by writing data to the SDO signal 32 for example In an embodiment, when the pins 10a and 10b are being used for I²C communication, the motor controller 14 (or another external circuit) may drive the SCL signal. In other words, the motor controller 14 may act as an I²C master and the serial communication module 32 may act as an I²C slave. In other embodiments, the serial communication module 32 may drive the SCL signal and may act as an I²C master.

If the motor controller 14 is acting as the I²C master, the motor controller 14 may initiate I²C communication by providing a start in accordance with I²C protocol. In an embodiment, the start condition may be provided by the start signal being high and the lock signal being pulled low. This may alert the serial communication module 32 that the pins 10a and 10b are being used for I²C communication. The serial communication module 32 may then receive the I²C communications. The motor controller 14 according to the I²C protocol, including a start bit, a control byte, data bytes, a stop bit, etc. The motor controller 14 and the serial communication module 32 may then initiate communication according to I²C protocol in which each byte transferred is acknowledged by the other side. For example, when the motor controller 14 is a master during a write, the controller 14 may send the data byte and the driver 10 may acknowledge each byte, and during a read, the driver 10 may send the data bytes and the controller 14 may acknowledge each byte.

Figure 2:
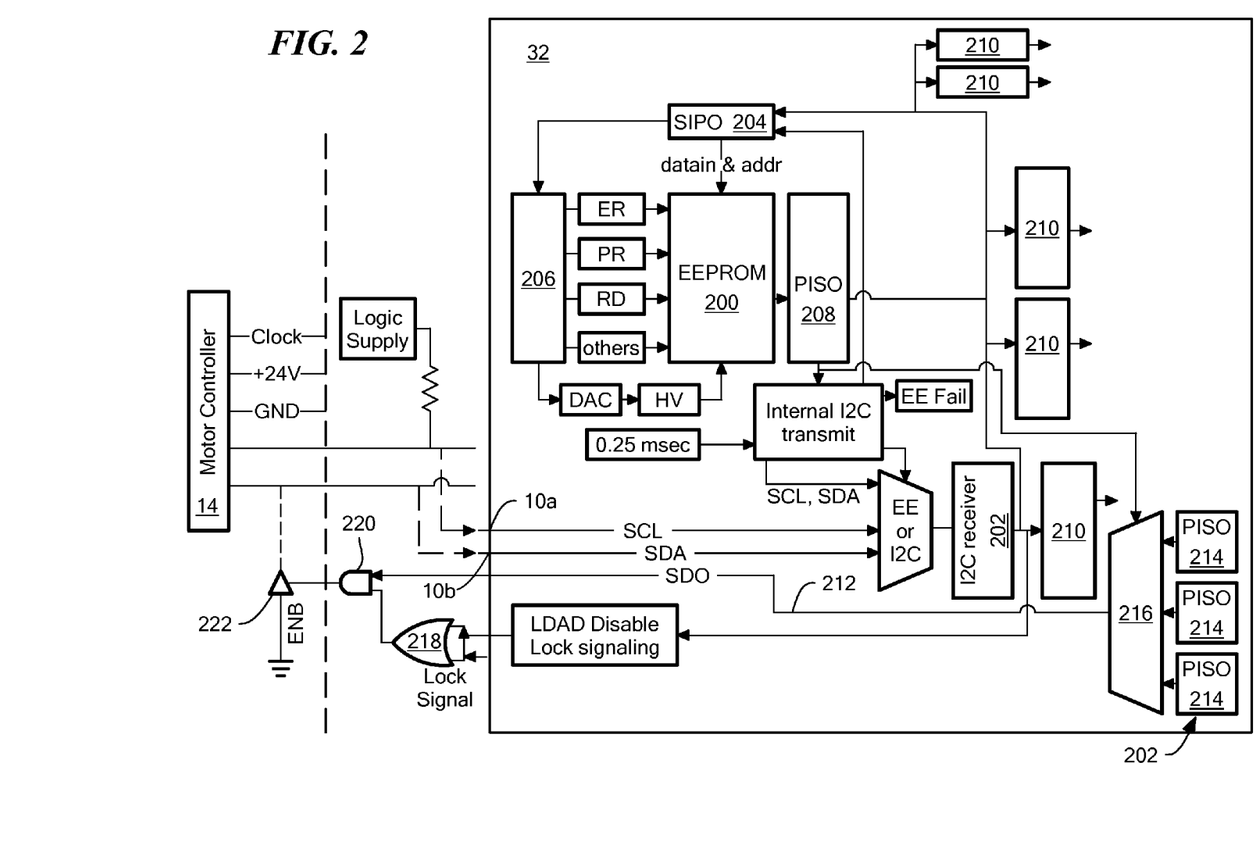
FIG. 2 is a block diagram of a portion of a motor controller including a serial communication module.

FIG. 2 shows an alternate view of the serial communication module 32 and the motor controller 14. In this view, the serial communication module 32 may include an EEPROM 200 or other memory, and other circuits to support reading and writing from the EEPROM 200. However, in alternate embodiments, the EEPROM 200 and any supporting circuits may be separate from the serial communication module 32.

FIG. 2 illustrates an example of how the pins 10a and 10b, which carry the start and lock signals respectively, can be used to read and write from the EEPROM 200 or other registers with I²C communications.

The EEPROM 200 may store various types of data for various application related functions. In an application, a first group of EEPROM registers may contain configurable system parameters, such may be used to evaluate or configure the driver 10. A second group of writeable registers support motor control functions, such as starting and stopping the motor and changing the motor direction. A third group of EEPROM registers may be readable registers to support motor feedback functionality and thus, may be used to store motor speed related information for example.

During a write operation, the motor controller 14 may initiate I²C communication by asserting a start condition at pins 10a and 10b and transferring an I²C communication to the motor driver 10. The motor controller 14 may then send an EEPROM address to be written to the motor driver 10. The I²C receiver 202 may receive the address and send it to a serial-in to parallel-out module (SIPO) 204, which may convert the address from serial data to parallel data. The SIPO 204 may then send the address to a loadable addressable register (MAD) 206, which may provide the address to the EEPROM 200. The motor controller 14 may then send data to be written to the EEPROM, which may be received by the I²C receiver, send to the SIPO 204, then to the LDAD 206, and then written to the EEPROM.

Since the start and lock pins 10a, 10b, respectively are still active as the start/stop input and the phase lock output during I²C communication, a control bit may be used to disable these functions and allow these pins to operate solely as an I²C bus. After the bit is set, the motor operation can be controlled via the I²C bus.

During a read operation, the address may be sent to the EEPROM 200, as described above. Once the address is received, the EEPROM 200 may write the data stored in that address to a parallel-in serial-out module (PISO) 208. The PISO 208 may convert the data to serial data, which may then be sent out over the I²C bus to the motor controller 14.

In an embodiment, the motor driver 10 may send out I²C data over the SDO line 212. As shown, a PISO 214 may convert parallel data into serial data that can be coupled to the SDO line 212 (e.g. through multiplexor 216). When the data is driven onto the SDO line 212, the logic gates 218 and 220 may enable and disable the buffer 222 so that the buffer 222 drives the data onto the lock pin 10b, where it can be received by the motor controller 14.

By reading and writing to the motor driver 10, the motor controller can 14 use I²C commands to program the EEPROM 200 to configure various motor and/or motor driver parameters, read and write test data, read and write control data for controlling the motor 12, etc.

The motor controller 14 may also use I²C commands to place the motor driver 10 into a test mode, to send test commands to the motor driver 10, to receive test data from the motor driver 10. For example, the motor controller 14 (or another external circuit such as a manufacturing test fixture) may send I²C commands to turn the motor on, turn the motor off, drive the motor in one direction, drive the motor in another direction, driver the motor at a particular speed, etc. In an embodiment, commands such as these may be used during a manufacturing test sequence.

Figure 3:
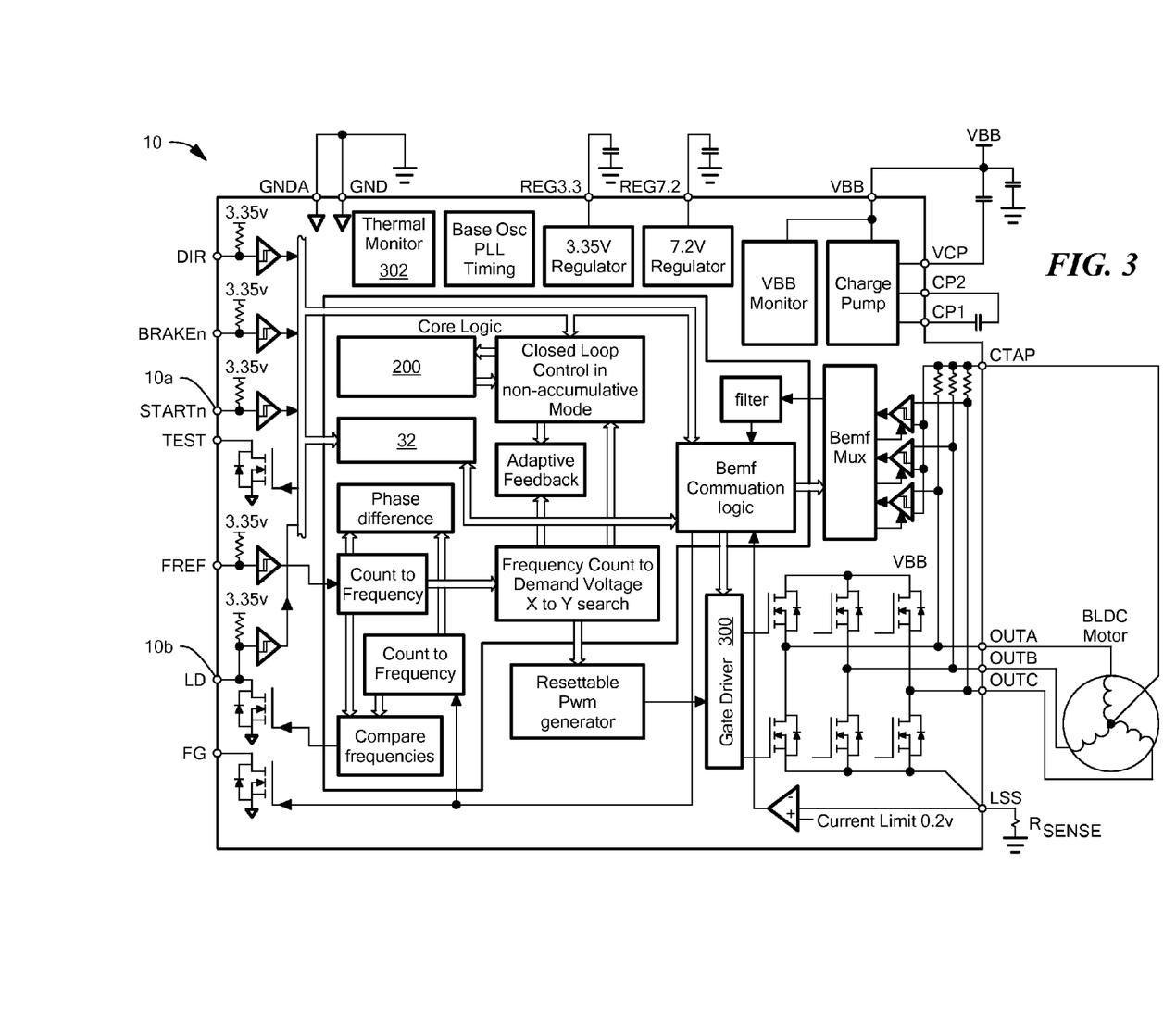
FIG. 3 is a block diagram of a motor driver providing serial communication.

FIG. 3 shows additional details of an illustrative motor driver 10. As shown, the motor driver 10 may include additional circuitry and modules including, but not limited to, a gate driver 300, a thermal monitor 302, voltage regulators, a charge pump, etc. In an embodiment, the motor controller 14 can send I²C commands over pins 10a and 10b to access data from or control these additional circuits and modules in a manner similar to that described above with respect to the EEPROM 200. Also, in FIG. 3, the EEPROM 200 and the serial communication module 32 are shown as separate blocks.

Figure 4:
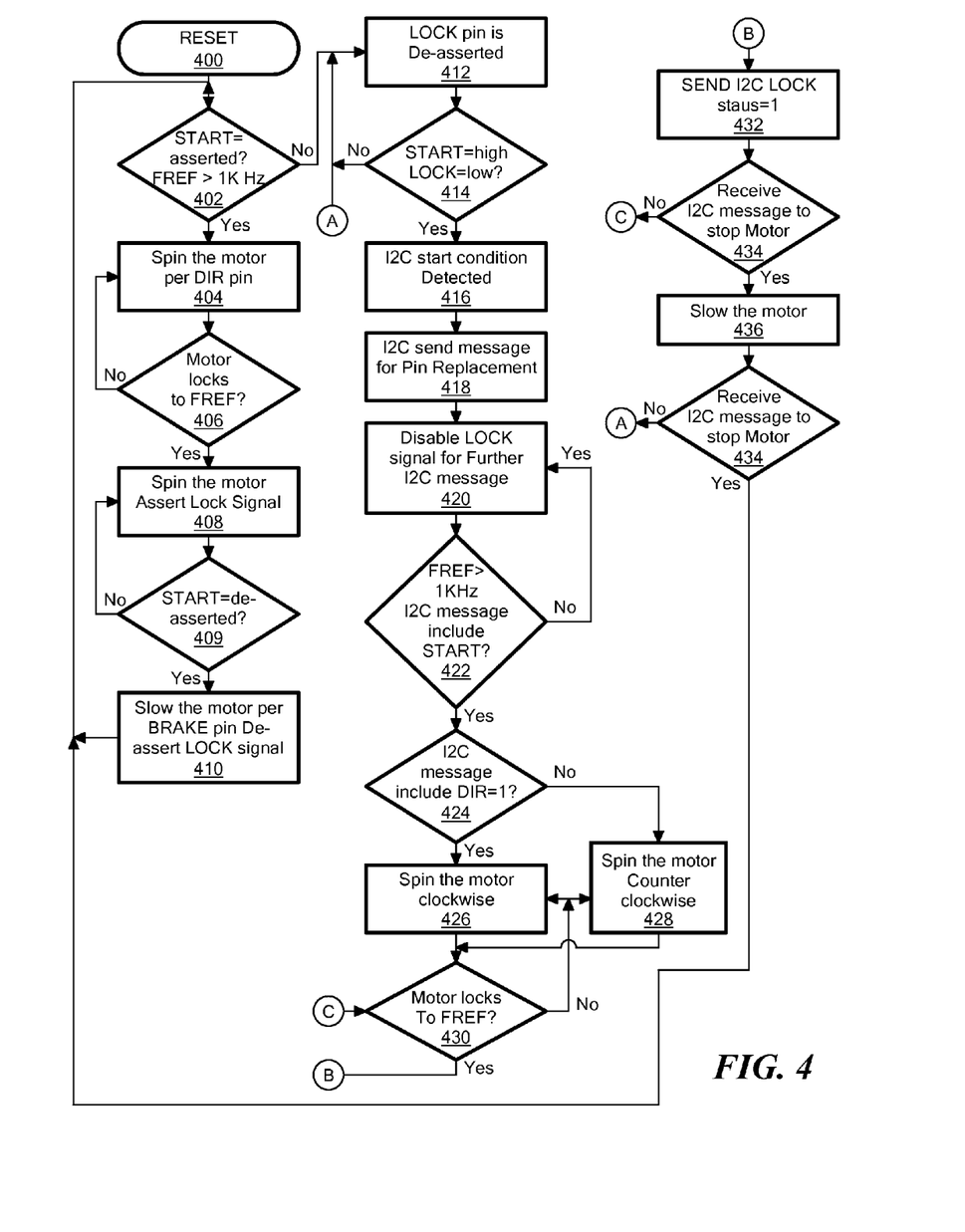
FIG. 4 is a flow diagram of serial communication.

FIG. 4 is a flowchart illustrating operation of a motor driver 10. In block 400, the motor driver 10 is reset and begins operation. In block 402, the motor driver 10 determines if the start signal is low and the frequency reference signal is greater than a predetermined frequency. If so, no I²C start condition is detected, and the motor driver 10 proceeds to block 404 to begin controlling or regulating the motor.

In blocks 404 and 406, the motor controller 10 drives the motor until the speed of the motor 12 locks the reference frequency (e.g. until a PLL locks the speed of the motor to the desired speed). Once the speed reaches the reference frequency, the motor driver 10 may continue to spin the motor and may assert the lock signal by pulling the lock signal tow in block 408. As long as the motor controller 14 continues to assert the start signal by driving it low, the motor driver 10 will continue to run the motor 12. Once the start signal is de-asserted and is pulled high in block 408, the motor driver 10 may proceed to block 410 and slow the motor according to a brake signal (See e.g. brake pin in FIG. 3) and de-assert the lock signal. The motor driver 10 may then proceed to block 402.

In block 402, if the start signal is not asserted or the reference frequency is less than 1 kHz, the motor driver 10 may de-assert the lock signal in block 412. The motor driver 10 may remain in block 412 until the start pin (i.e. the SCL signal) is high and the lock pin (i.e. the SDA signal) is low, which may indicate an I²C start condition, in block 414. The motor driver 10 may detect the I²C start condition in block 416 and begin serial communication using the I²C signals on pins 10a and 10b (see FIG. 1).

Blocks 418 through 440 show an illustrative test sequence that may be performed by communicating with the motor driver 10 via I²C over pins 10a and 10b. Blocks 418 through 440 are for illustrative purposes only. In other embodiments, motor driver 10 may employ other test sequences, or may not include test sequences.

In block 418, the motor driver 10 may send a message for pin replacement. This may place the motor driver 10 and/or the motor controller 14 into a test mode where pin functions have been re-assigned to various registers or memory locations For example, the STARTn pin, the DIR pin, and the BRAKEn pin (see FIG. 3) may be replaced by values in internal registers. These register values may also be referred to as STARTn, DIR, and BRAKEn register values. Thus, the functions performed by the STARTn, DIR, and BRAKEn pins may be replaced b these register values, which can be manipulated by I²C commands that access and modify these register values.

In block 420 the motor driver 10 may disable the lock signal such as with the use of a control bit so that pin 10b (FIG. 1) can be used as an SDA signal for the remainder of the test sequence.

If the frequency reference signal is greater than a predetermined amount and an I²C message includes a command or value that sets the STARTn register value, then the motor driver may proceed to block 424. If the I²C message asserts a command that sets the DIR register value so that DIR=1, then the motor driver 10 may spin the clockwise in block 426. Otherwise, the motor driver 10 may spin the motor 12 counter-clockwise block 428.

I²C After spinning the motor, the motor driver may check that the motor speed is locked to the frequency reference signal in block 430. If so, the motor driver may send an I²C, message to the motor controller 14 indicating that the phase lock has been established in block 432.

If an I²C message to stop the motor is received in block 434, the motor driver 10 may slow the motor in block 436. If an I²C message is received to stop testing in block 440, the motor driver 10 may exit the test sequence and proceed to block 402. Otherwise, the motor driver 10 may proceed to bock 412 to continue the test sequence.

One skilled in the art will recognize that, although certain signals may be described above as digital signals or analog signals, this is not intended to be a limitation. In various embodiments, the digital signals described above can be replaced by equivalent analog signals and vice versa. Similarly, components described above as receiving or producing a digital signal or an analog signal may be replaced by equivalent components that receive or produce analog signals, signals, or other types of signals.

Having described various embodiments, which serve to illustrate various concepts, structures and techniques, which are the subject of this patent, it will now become apparent to those of ordinary skill in the art that other embodiments incorporating these concepts, structures and techniques may be used. It will be appreciated by those of ordinary skill in the art that the circuitry and techniques described above in connection with illustrative motor driver 10, for permitting serial communication, such as with the $I^2C$ protocol, over connections otherwise used for other application functionality, can be applied to other types of circuits. As one example, voltage regulators connections, such as voltage regulators that use an "enable" input pin and an "in regulating range" pin. In such regulators, a serial communication module (similar or the same as serial communication module 32 in FIG. 1) may be coupled to the "enable" and "in regulating range" pins to send and receive serial communications over those pins. Of course, the serial communication module may also be coupled to any other pins that can be used to send and receive serial data communications. Accordingly, the scope of the patent should not be limited to the described embodiments but rather should be limited only by the spirit and scope of the following claims.

What is claimed is:

1. A motor driver comprising:
   a motor coil driver responsive to a motor command signal to control a motor;
   a feedback circuit to provide a feedback signal representing a status of the motor;
   a first terminal coupled to receive the motor command signal when the motor driver is controlling a motor;
   a second terminal coupled to transmit the feedback signal when the motor driver is controlling the motor;
   a motor control logic module that receives the motor command sign as an input from the first terminal, sends control signals to the motor coil driver to drive the motor in response to the command signal, receives the feedback signal from the feedback circuit, and generate a motor status signal representing the status of the motor as an output to the second terminal in response to the feedback signal;
   a serial data communication circuit configured to send and receive a serial data signal in accordance with a serial communication protocol over the first and second terminals when the motor is stopped or when a voltage on the first and/or second terminals is not pulled high or low; and
   a multiplexor coupled to the motor control logic module and the serial data communication circuit to selectively couple the second terminal feedback signal to the motor control logic module and the serial communication module in response to a determination that the motor is stopped or a voltage on the first and/or second terminals is not pulled high or low.

2. The motor driver of claim 1 wherein the first terminal is a start pin to receive a signal capable of starting the motor.

3. The motor driver of claim 1 wherein the second terminal is a lock pin on which a signal is provided indicating whether a speed of the motor is locked to a frequency reference.

4. The motor driver of claim 1. wherein the serial communication protocol is an $I^2C$ protocol.

5. The motor driver of claim 4 wherein one of the first and second terminals is configured as an SCL input signal and the other of the first and second terminals is configured as an SDA shared bus signal.

6. The motor driver of claim 1 wherein the serial data communication circuit is configured to send and receive data to control testing of the motor driver, the motor, or both.

7. The motor driver of claim 1 wherein the serial data communication circuit is configured to send and receive data to control programming of the motor driver.

8. The motor driver of claim 1 wherein the serial data communication circuit is configured to communicate over the first and second terminals when the motor driver is not controlling the motor.

9. The motor driver of claim 1 wherein the serial data communication circuit is configured to communicate over the first and second terminals when an $I^2C$ start condition is received.

10. The motor driver of claim 1 wherein the serial data communication circuit is always active to receive or transmit serial data on the first and second terminals.

11. A method comprising the steps of:
    receiving, by a motor coil driver circuit, a motor command signal to control a motor;
    providing, by a feedback circuit, a feedback signal representing a status of the motor;
    receiving, by a motor driver circuit, a motor command signal on a first terminal when the motor coil driver circuit is controlling a motor;
    transmitting, by the motor control circuit, motor status signal on a second terminal when the motor coil driver circuit is controlling the motor; and
    receiving, by a motor control logic module, the motor command signal as an input from the first terminal;
    sending, by the motor control logic module, control signal the motor coil driver to drive the motor in response to the command signal;
    receiving, by the motor control logic module, the feedback signal from the feedback circuit;
    transmitting, by the motor control logic module, a motor status signal representing the status of the motor as an output of a second terminal in response to the feedback signal when the motor coil driver is controlling the motor;
    sending and receiving serial data communication signals, by a serial data communication circuit, in accordance with a serial data communication protocol, over the first, and second terminals when the motor is stopped or when a voltage on the first and/or second terminals is not pulled high or low; and
    selectively coupling the second terminal feedback signal to the motor control logic module to the serial communication module in response to a determination that the motor is stopped or a voltage on the first and/or second terminals is not pulled high or low.

12. The method of claim 11 wherein receiving the motor command signal comprises receiving a signal indicating whether to start the motor on one of the first and second terminals.

13. The method of claim 11 wherein transmitting the status signal comprises transmitting a signal indicating whether a speed of the motor is locked to a reference frequency on one of the first and second terminals.

14. The method of claim 11 wherein the serial communication protocol is an I²C protocol.

15. The method of claim 14 wherein sending and receiving serial data communication signals includes driving an SCL signal on one of the first and second terminals and driving an SDA signal on the other of the first and second terminals.

16. The method of claim 11 wherein sending and receiving the data communication signals includes sending and/or receiving test signals.

17. The method of claim 11 wherein sending and receiving the data communication signals includes sending and/or receiving programming signals.

18. The method of claim 11 wherein sending and receiving the data communication signals over the first and second terminals includes sending and/or receiving the data communication signals after an I²C start condition is received on the first and/or second terminal.

19. The method of claim 11. wherein sending and receiving the data communication signals over the first and second terminals includes providing a transceiver, coupled to the first and second terminals, that is always active to send or receive the serial data communication signals.

* * * * *